June 10, 1930.   G. KLEIN ET AL   1,762,301
TICKET CANCELING MACHINE
Filed April 21, 1928   8 Sheets-Sheet 1

June 10, 1930.   G. KLEIN ET AL   1,762,301
TICKET CANCELING MACHINE
Filed April 21, 1928   8 Sheets-Sheet 2

Patented June 10, 1930

1,762,301

UNITED STATES PATENT OFFICE

GEORGES KLEIN AND PIERRE MASSOT, OF PARIS, FRANCE

TICKET-CANCELING MACHINE

Application filed April 21, 1928, Serial No. 271,903, and in Belgium April 26, 1927.

The present invention relates to ticket-canceling machines and, more particularly, to those adapted to cancel a plurality of tickets arranged side by side on a strip.

One of the objects of the invention is to provide a device capable of canceling strips of tickets of variable length, each of said tickets representing a unit of value covering the cost of transportation of an article or a person over a given distance under given conditions (e. g. 1st, 2nd, or 3rd class).

Another object is to provide a machine capable of (1) canceling a strip of transportation ticket and (2) indicating the limiting point or distance for which the ticket remains valid.

Still another object is to provide means for preventing improper cancellations or indications being registered on the ticket.

A further object is to provide a plurality of pressure elements adapted to be actuated manually to force a ticket into firm contact with a canceling device.

A still further object is to provide means for assuring even pressure of the ticket against the canceling mechanisms.

An additional object is to provide means for preventing action of certain of the pressure elements while permitting others to function normally.

Further objects will appear in the course of the detailed description now to be given with reference to the accompanying drawings, in which:—

Figures 13, 14, 19, 20:
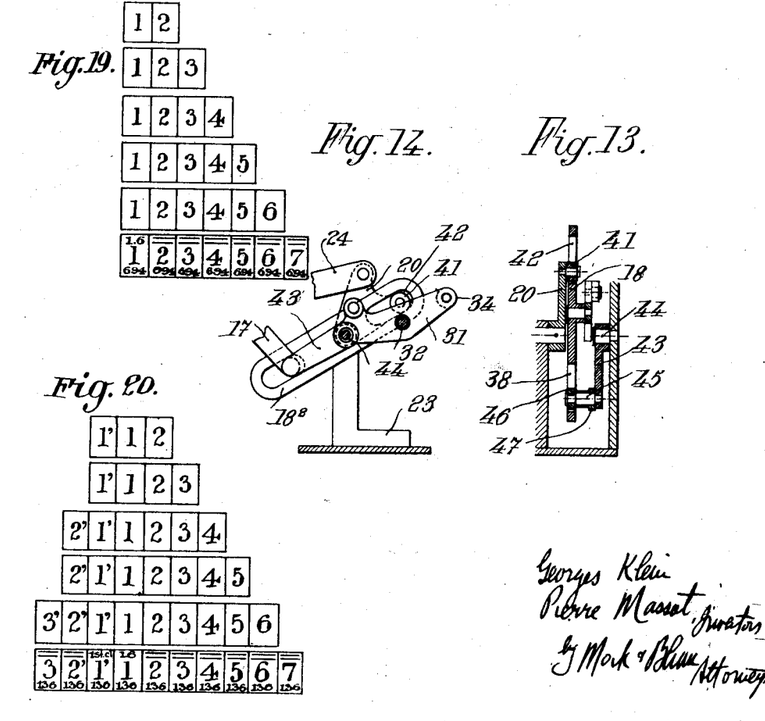
Figs. 19 and 20 represent the type of tickets intended for use with the machines shown in Figs. 1 to 18.
Figures 15, 16:
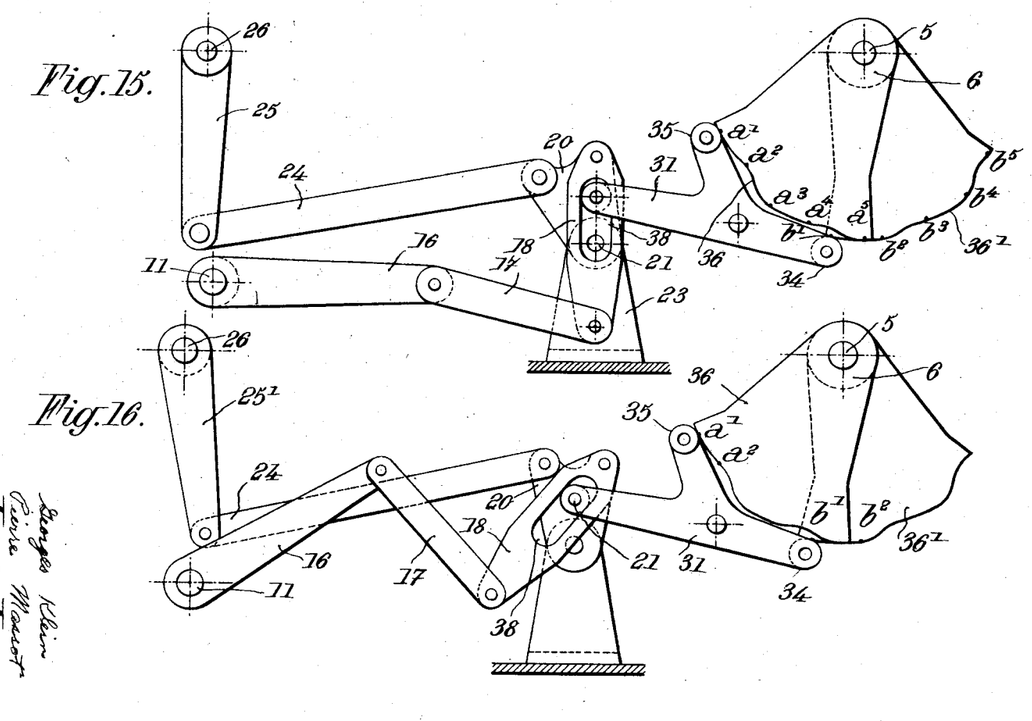
Figs. 15 to 18 show a modified form of part of the assembly shown in Figs. 1 to 6, each of said figures representing different operative positions of the modified device.
Figures 17, 18:
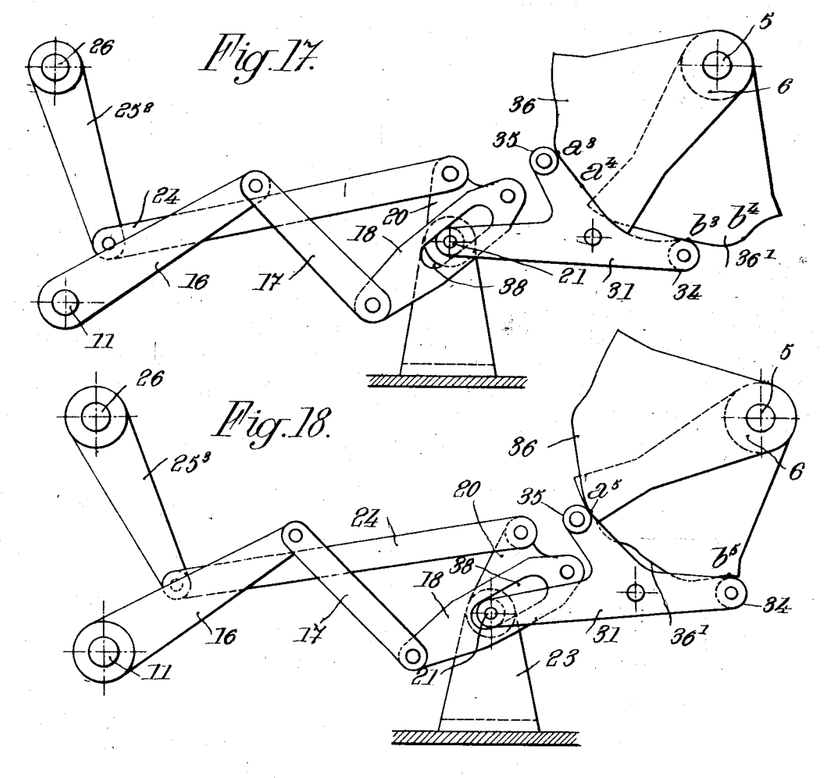
Figure 21:
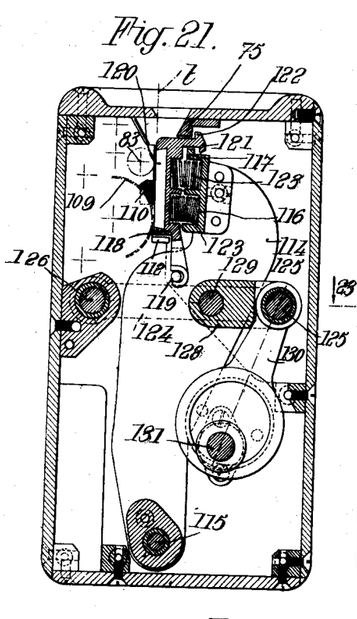
Fig. 21 is a section through one illustrative embodiment of the ticket marking assembly showing the machine in the position that it occupies at the moment that marking pressure is being exerted.
Figure 22:
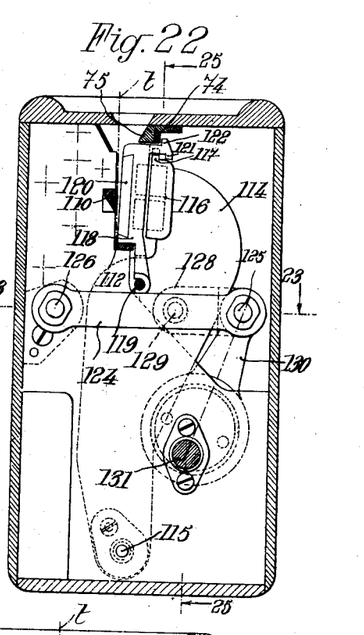
Fig. 22 represents a section parallel to the one shown in Fig. 21, with certain elements in position to prevent marking action.
Figures 23, 24:
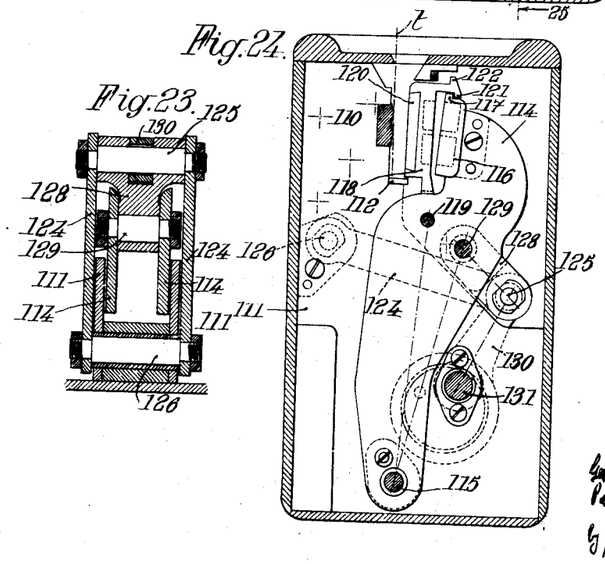
Fig. 23 is a section taken on line 3—3 of part of the machine shown in Fig. 22.
Fig. 24 is a view corresponding to Fig. 22 but with the ticket actuating levers in open position.
Figure 25:
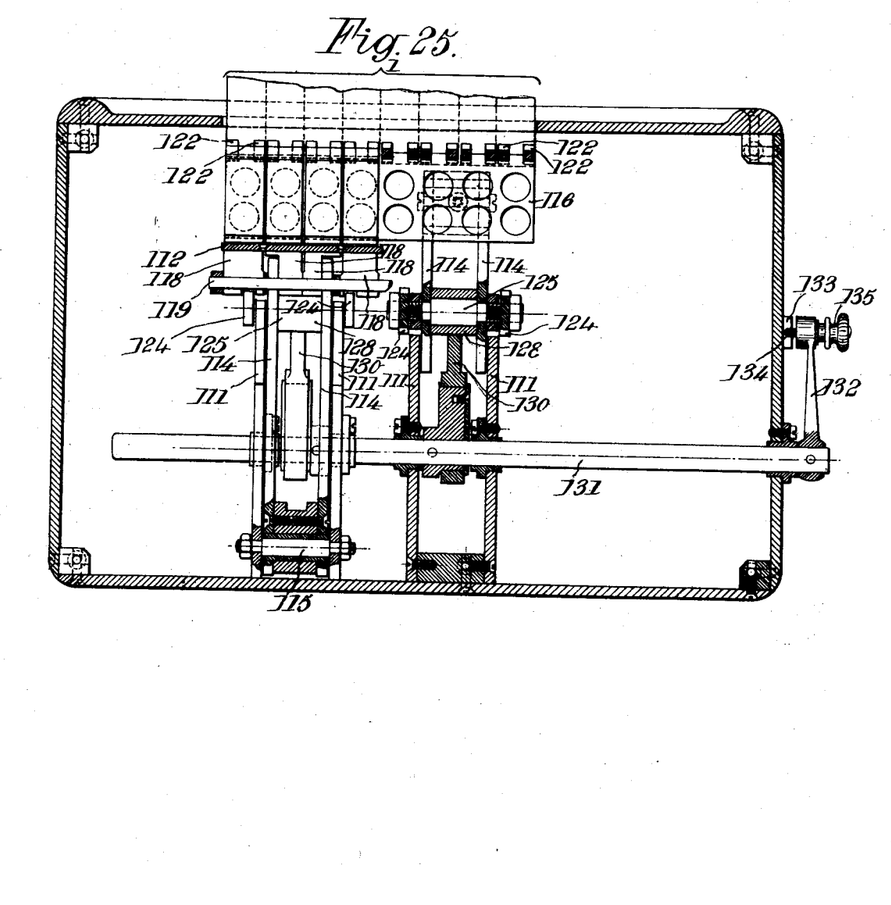
Fig. 25 is a partial section taken on line 5—5 of Fig. 22, showing certain elements in elevation.

Referring to the various figures of the drawing, Figs. 19 and 20 show tickets designed for use in the machines hereinbelow described. These tickets are printed on a single strip and each may represent a certain mileage or the tariff value required for covering a certain zone. The type of strip shown in Fig. 19 is designed for use in travelling in a certain class (e. g. second or third class), while the one shown in Fig. 20 carries two kinds of tickets, one covering transportation in the class shown by the strip illustrated in Fig. 19 (generally 2nd class) and indicated by the tickets 1 to 7, and the other, 1' to 3', representing units of extra charge for baggage or for travelling in a better class (e. g. first class).

The machines used for canceling the above described tickets may function by perforation or by inked markings to indicate that part (or the whole) of a strip of tickets is no longer valid, or to indicate the limit or limits for which said strip remains valid.

Figs. 1 to 14 inclusive show forms of machines adapted for use on a transportation line divided into a maximum of 5 sections and carrying 1st and 2nd class passengers, the 2nd class tariff requiring 2, 3, 4, 5 and 6 tickets respectively for sections 1 to 5, and the 1st class tariff requiring a payment equivalent to 3, 4, 5, 6, 7 and 8 tickets respectively for the same 5 sections. Referring to these figures of the drawing, 1 represents an outer casing provided with a long narrow slot $1^1$ in its upper wall, 2 and 3 are movable transverse walls forming stops for limiting the length of slot $1^1$. Wall 3 controlling the extra charges for first class passage may occupy any one of three positions. The first of these positions,—at the extreme right—corresponds to a 2nd class passage of any length. When the wall is at 3' (Fig. 9), the machine will cancel tickets (see Fig. 20) covering a passage over one to 3 sections in 1st class, and the wall will be spaced the width of one ticket from its first position (see tariff above). For a passage covering 4 or 5 sections in first class, wall 3 must be displaced by an amount equal to the width of one ticket from position 3' to occupy position $3^2$ (Fig. 10). Wall 2 may occupy any one of 5 positions spaced slightly more than 1, 2, 3, 4 or 5 times the width of a ticket from the extreme right (first position) position of wall 3, each position corresponding to the number of sections traversed. From the foregoing, it is obvious that walls 2 and 3 limit the length of the strip of tickets which may be introduced into slot $1^1$. These walls may be displaced by any convenient form of mechanism, preferably, by one of the type hereinafter to be described.

The interior of casing 1, contains the wall-displacing mechanism above mentioned, a canceling mechanism to be described further on, and a plurality of partitions $1^2$ which serve to support shafts and various operating elements forming part of said mechanisms.

Wall 2 is displaced by means of the following assembly: a lever 4, provided with a handle 4', said lever 4 to be hereinafter designated as a "distance lever",—a shaft 5 keyed to lever 4 and carrying a rotatable lever 6 having one extremity engaging in a U-shaped element 7 which is rigidly connected to a slide carrying wall 2 and which may be displaced along a grooved guideway 9 positioned in parallel relation to slot $1^1$. As may be seen from Figures 2, 9 and 14, a rotary movement of lever 4, brings wall 2 into any one of the 5 possible positions where it may be held by a locking device to be described further on.

The assembly controlling the movement of wall 3 comprises a lever 25 oscillatably mounted on a fixed shaft 26, and arranged to actuate a U-shaped member 28 (through the intermediary of a roller engaging between the arms of the U) integral with a slide 29 carrying wall 3. Lever 25 is oscillated by a link 24 connected to a lever 20 which is pivotally mounted at 21 on a fixed support 23, lever 20 being pivotally connected at 19 to a differential lever 18, whose position and movement are controlled both by distance lever 4 and by a lever 10, hereinafter designated as a "class lever", mounted on shaft 11. Coaction of levers 4, 10 and 18 may, obviously, be effected in a variety of ways. As shown in Figs. 2, 3, 6, 9 and 10, lever 4 may for example, be arranged to actuate a pair of conjugated cams 36, 36' mounted on lever 6, said cams acting on rollers 35 and 34, respectively of a lever 31 pivotally mounted on shaft 32 so as to maintain said last named lever in either one of two position i. e. (1) the position shown in Figs. 2 and 9 wherein lever 31 is held in place between cam 36' and a stop 33, said position corresponding to a ticket for 1, 2 or 3 sections, and (2) the position shown in Fig. 10, wherein lever 31 is maintained in place between cam 36 and abutment 33', and corresponds to a passage covering 4 or 5 sections. Lever 31, it will be noted carries a roller 37 which moves in guideway 38 formed in differential lever 18. As shown in Figs. 1, 2, 6, 9 and 10, class lever 10, is arranged to actuate a lever 16, keyed to shaft 11, and the latter lever reacts on differential lever 18 through the intermediary of a link 17. Lever 10, in this form of assembly, is maintained in one of two positions (position for 2nd class passage, Fig. 2,—position for 1st class passage, Figs. 9 and 10) by a cam 12 held, under the tension of spring 15, in contact with a specially formed arm 14 mounted on shaft 11 and by a pair of stops $16^1$ and $16^2$ which limit the movement of arm 16. Groove 38 in differential lever 18 is so formed that (1) when class lever 10 is in 2nd class position (Fig. 2), differential lever 18 remains stationary irrespective of the position of distance lever 4, wall 3 then taking its position at the extreme right; (2) when class lever 10 is in 1st class position (Fig. 9), differential lever 18 takes position $18^1$, if distance lever 4 be fixed at a position corresponding to 1, 2 or 3 sections, and wall 3 moves into position $3^1$; (3) when class lever 10 is in 1st class position and distance lever 4 registers 4 or 5 sections, lever 18 takes position $18^2$ (Fig. 10) and wall 3 moves into position $3^2$.

The canceling mechanism cooperating with the above described ticket-positioning assembly comprises properly formed rotatable discs carrying characters or signs in relief thereon and adapted to produce any one of a number of marks, perforations or indications on (or in) the ticket to be canceled.

Element 48 is such a disc and is intended to register the section where the passenger came aboard on the ticket at the left hand extremity of the strip. The disc is mounted on a shaft 49 supported on partitions $1^2$ substantially parallel to slot $1^1$, and carries a rotatable indicator 50 having markings thereon which, when brought opposite a suitably placed index mark, indicate the position of disc 48.

A group of discs 51 serves to indicate the section where the passenger should get off on the tickets not marked by disc 48. These discs are keyed in position on a hollow shaft 52 which is loosely mounted on shaft 49 and are connected to a differential mechanism which fixes their position according to the combined positions of indicator 50 and distance lever 4. This differential mechanism comprises two bevel gears 53 and 54 keyed, respectively to hollow shaft 52 and to shaft 49, and connected in driving relation to one another through the intermediary of bevel gear 55 loosely mounted on a shaft 56 supported on a sleeve 57 fitting loosely over shaft 49, sleeve 57 carrying a toothed sector 62 in mesh with a sector 58 which is given various angular displacements by bevel gears 59 and 60 (Fig. 1); gear 59 being keyed to shaft 5 controlled by lever 4, while gear 60, which carries sector 58, is loosely mounted on a fixed shaft 61. The various operating elements are adjusted so that (1) when distance lever 4 indicates a distance of one section and indicator 50 is set at section 1 (point where passenger boards), both discs 48 and 51 indicate section 1, (2) the indications of discs 51 are in reverse order to those on disc 48 and (3) the displacement of distance lever 4 to indicate one section results in a rotation of sleeve 57 through an arc equal to one tenth of a turn. Means are provided for making the position of discs 51 visible from the outside consisting of an indicator 78, rotatably mounted on fixed shaft 79, and visible through slot 80 (Figs. 1, 2 and 5), said indicator being rotated by an intermediate pinion 82 meshing both with a gear 81 attached to indicator 78 and with a gear 83 keyed to hollow shaft 52.

Means are provided for maintaining levers 7 and 10 and the elements coacting therewith in fixed position during the canceling operation effected by discs 48 and 51, comprising a specially formed disc 63 rigidly connected to toothed sector 60 and rotatably mounted on shaft 61 (Fig. 7), said disc having a plurality of notches 64 formed in the periphery thereof,—a roller 65 adapted to engage in notches 64 under the action of a spring 67,—and a lever 66 carrying roller 65 at one extremity and having its other extremity formed to ride over the projections of a pentagonal cam 68, said lever being held in contact with cam 68 by a spring (not shown), cam 68 being connected to turn with shaft 49 by a key holding gear 54 in place.

Means are further provided for preventing a position of lever 4 incompatible with the position of disc 48 registering the point of boarding i. e. if the distance lever is set at 2, 3, 4 or 5 sections, the number indicating the section where the passenger came aboard should not exceed 4, 3, 2 and 1 respectively. The assembly constituting this means consists (Figs. 2, 7 and 8) of a cam 69 keyed to shaft 49,—a lever 70 held in contact with said cam by a spring (not shown), extremity 70' of said lever, under the action of cam 68, dipping toward shaft 61 as the number indicating the section where the passenger got on increases,—and a series of notches of increasing radius 71 formed on the periphery of disc 63, the position of said notches being adjusted to prevent lever 70 assuming a position permitting incompatible action of lever 4 and disc 48. In the position shown in Fig. 7, element 73 indicates a passage over the distance of 1 section, and lever 70 indicates that the passenger boarded at section 1. Under these conditions, if lever 4 is not disturbed, indicator 50 controlling the boarding indications may be adjusted to any position. Similarly, if indicator 50 is not disturbed, distance lever 4 may be displaced at will. On the contrary, in the position represented by Fig. 8 corresponding to a passage covering 1 section, the point of boarding being section 5, distance lever 4 cannot be displaced.

Means are provided for counteracting the pressure exerted by assembly 72 (forming part of the ticket-actuating device shown in Figs. 21 to 25 and to be described further on) on such of the canceling or indicating discs lying outside of the range of the ticket to be canceled and consists of two elements 73 and 74 (Figs. 3, 5 and 6) of rectangular section connected to U-shaped elements 7 and 28 and displaceable in a direction parallel to slot $1^1$,—and an abutment 75 rigidly attached to the upper wall of casing 1 and forming part of the lateral wall of the cavity into which the tickets are introduced. Elements 73 and 74 may be moved to occupy positions between abutment 75 and the heels 122 of a system of levers 118 adapted to move the ticket into contact with the cancellation discs, said elements (73 and 74) functioning, in each position of adjustment of walls 2 and 3, to prevent those elements 76 lying outside the range of the ticket from executing the movement for effecting a cancellation operation.

Figure 1:
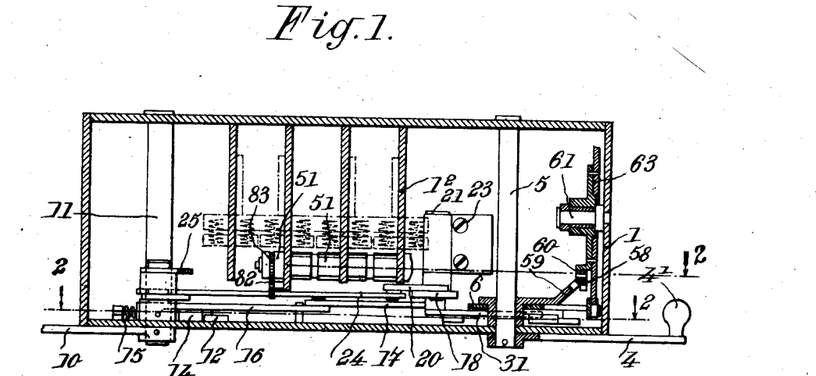
Fig. 1 represents a section (taken on line 1—1 of Fig. 2) through one constructive embodiment of the invention.
Figure 2:
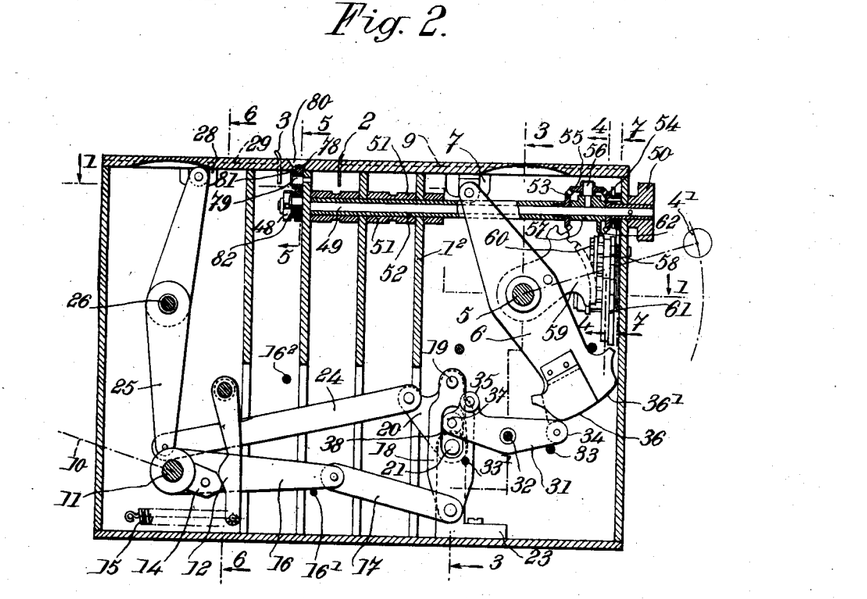
Fig. 2 is a section taken, for its lower part, on line 2—2 of Fig. 1 and, for its upper part, on broken line 2—2¹ of Fig. 1.
Figure 3:
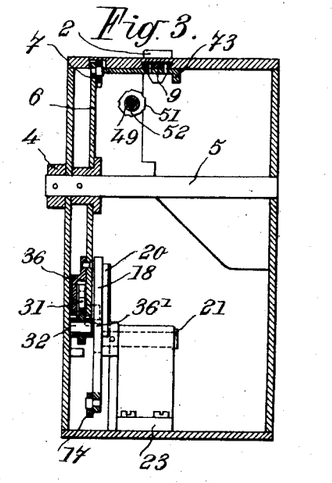
Fig. 3 illustrates the same device in a section taken on line 3—3 of Fig. 2.
Figure 4:
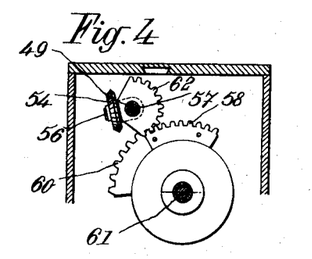
Fig. 4 represents a section on line 4—4 of Fig. 2 with certain elements occupying a somewhat different position than that indicated in Fig. 1.
Figure 5:
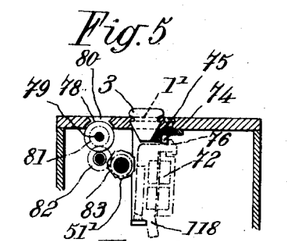
Fig. 5 is a section taken on 5—5 of Fig. 2.
Figure 6:
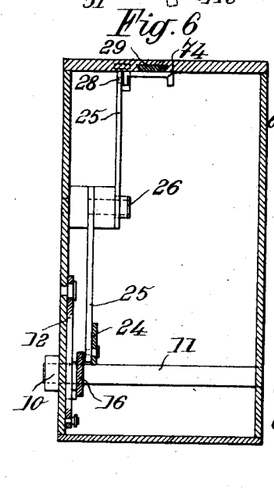
Fig. 6 is a transverse section on line 6—6 of Fig. 2.
Figure 7:
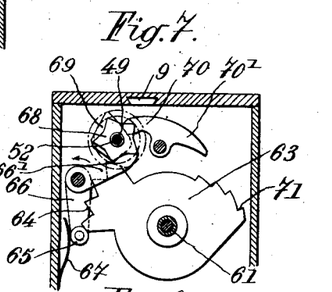
Figs. 7 and 8 are sections on line 7—7 of Fig. 2 showing certain of the elements illustrated in Figs. 1 to 6 in different operative positions.
Figure 8:
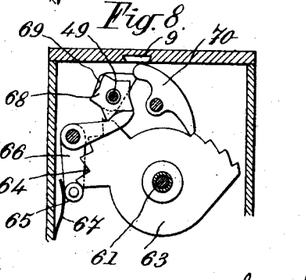
Figure 9:
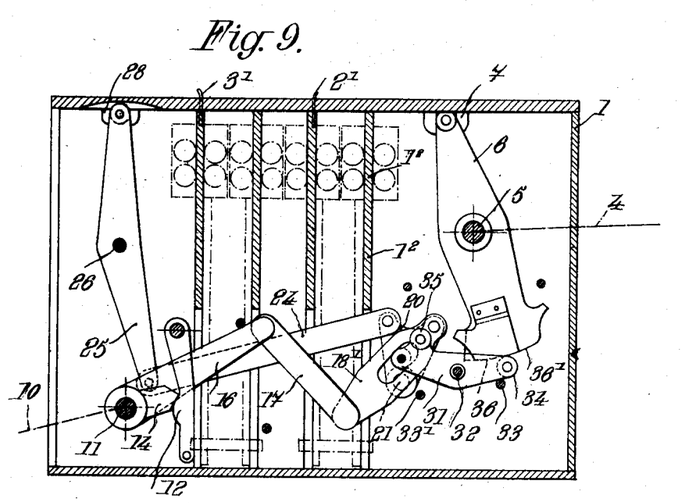
Figs. 9 and 10 are sections corresponding to the one shown in Fig. 2 but with various of the operative elements in positions displaced to effect special operations.
Figure 10:
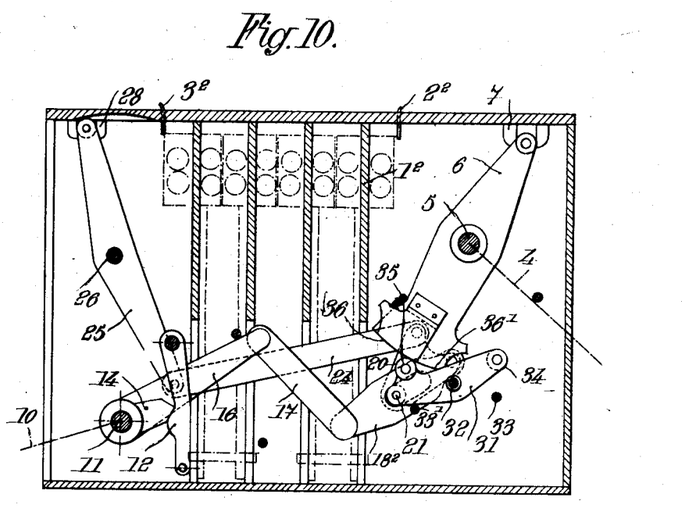
Figure 11:
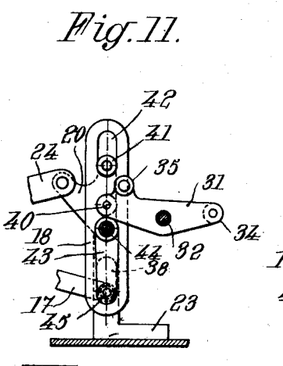
Figs. 11 to 14 show possible variants of certain elements illustrated in Figs. 1 to 6, Figs. 11, 12 and 14 being elevations and Fig. 13 on line 13—13 of Fig. 11.
Figure 12:
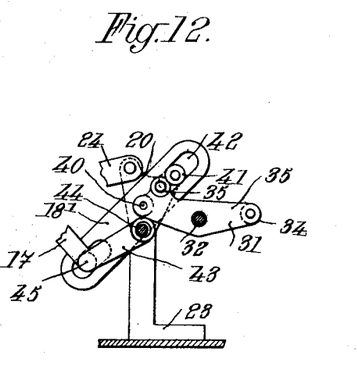

Figs. 11 to 14 show a modification of the differential lever assembly 18 represented in Figs. 2, 9 and 10. In this form of device, lever 31, instead of engaging with differential lever 18 by means of a roller inserted in a groove, is articulated directly to the differential lever by means of a pin 40. In addition, there is provided an oscillating element 20, pivotally connected to link 24, and carrying a roller 41 engaging in a groove 42,—and a supporting arm 43, pivotally mounted on a fixed axis 44, and carrying a pin 45 provided with a sleeve 47 and a roller 46, said roller engaging in a groove 48 formed in lever 18, while sleeve 47, which is rigidly connected to link 17, follows the movements of lever 10. Grooves 42 and 43 are formed so that (1) when class lever 10 registers 2nd class,—irrespective of the position of distance lever 4 and, consequently, of link 31,—differential lever 18 remains in the same position (Fig. 11) i. e. that corresponding to the extreme right position of wall 3; (2) when class lever 10 registers 1st class and distance lever registers 1 to 3 sections, differential lever 18 moves to position $18^1$ (Fig. 12) and wall 3 to the position corresponding to passage over 1 to 3 sections in 1st class; (3) when lever 10 stands at 1st class and distance lever 4 is set for 4 or 5 sections, lever 18 moves to $18^2$ (Fig. 13) and wall 3 to the position for 1st class passage over 4 or 5 sections.

The form of device shown in Figs. 15, 16, 17 and 18 is similar to the one shown in Figs. 1 to 10 except that, here, the extras for first class passage are different. The second class tariff remains 2, 3, 4, 5, and 6 tickets for passage over 1, 2, 3, 4 and 5 sections respectively, but the corresponding 1st class tariff is 3, 4, 6, 7 and 9 tickets. Under these conditions it becomes necessary to provide a 4th position for wall 3 spaced the width of 3 tickets (9—6) from its extreme right position. This is effected by giving cams 36 and $36^1$ proper forms to displace lever 31 to three different positions, the movement of the cams being, as before, under the control of arm 6 actuated by lever 4. In the first of these three positions (Figs. 15 and 16), corresponding to a trip 1 or 2 sections long, rollers 34 and 35 of lever 31 ride on the cylindrical portions $a^1$, $a^2$ and $b^1$ $b^2$ of cams 36 and $36^1$; in the second position (Fig. 17) corresponding to a 3 or 4 section trip, rollers 34 and 35 ride on cylindrical portions $a^3$ $a^4$ and $b^3$ $b^4$ of the cams; while in the third position (Fig. 18), a 5 section trip, 34 and 35 coact with cylindrical surfaces $a^5$ and $b^5$ of the two cams. The conjugation of the 3 positions of lever 31 with the 2 possible positions of class lever 10 yields a total of 4 possible positions for lever 25 controlling wall 3, to wit (1) Fig. 15, position "25": trip covering 1 to 5 sections in 2nd class; no extras—(2) Fig. 16, position "$25^1$": 1st class passage over 1 or 2 sections; one ticket extra—(3) Fig. 17, position "$25^2$", 3 or 4 section trip in 1st class; two tickets extra—(4) Fig. 18, position "$25^3$", 1st class fare over 5 sections; 3 tickets extra.

The assembly designed to bring the tickets into contact with the canceling discs is shown, for the sake of clearness, in a separate group of figures—Figs. 21 to 25—and consists of two groups of ticket actuating mechanisms (Fig. 25) each adapted to handle a strip 4 tickets long, each of said groups being formed of a pair of plates 111 held in spaced relation by proper cross-pieces,—a pair of pressure levers 114 pivotally mounted on a fixed shaft 115, and carrying a pressure member 116 at their free extremity, said pressure member having a shoulder 117 formed thereon,—a plurality of pressure platens 118 corresponding numerically to the number of tickets to be canceled by each group of ticket actuating mechanisms, each pressure platen being formed (1) with a lower hook-shaped extremity in loose pivotal engagement with a pin 119 mounted on plates 111, (2) with an upper extremity having a first shoulder 121 fitting over shoulder 117 and a second shoulder 122 extending behind elements 74 and 75 and (3) with a recessed portion carrying a block of leather, rubber or other yielding material 120 adapted to contact with the ticket,—springs 123 tending to force platens 118 away from pressure members 116,—a system of links and levers for actuating pressure levers 114 consisting of a pair of levers 124 pivotally mounted, at one extremity on fixed shaft 126, and, at their other extremity on shaft 125, a link 128 extending from shaft 125 to a pin 129, a link 130 pivoted at 125 and eccentrically mounted on shaft 131,—and means for actuating the aforesaid link and lever system comprising a crank 132 rigidly connected to shaft 131, a recessed stop 133, and a reciprocable pin 134 adapted to enter the recess in stop 133 and rigidly connected to a spring actuated handle 135. The lengths of levers 124 and of links 128 and 130 are so chosen that, when the pressure levers are in closed position, pins 126, 125, and 129 lie substantially in the same straight line. Under these conditions, the force required for actuating crank 132 is reduced to a minimum. The apparatus is completed by (1) a horizontal bar 112 adapted to support the edge of ticket $t$ inserted into slot $1^1$, (2) a bar 110 mounted in the plane of the characters carried by indicating discs 48 and 51 and adapted to register the number of the machine and to coact with said discs to exert counter pressure on pressure member 116 (3) a rotatable disc 109, adjustable from the outside of the casing by mechanism not shown and adapted to register the date and any other data, said disc, lying in line with bar 110.

The device operates in the following way: Assuming that the machine is to be operated over a transportation line divided into 5 sections and carrying 1st and 2nd class passengers, tickets of the kind shown in Figs. 19 and 20 are printed in strips good for 2nd class only—Fig. 19—or provided with tickets corresponding to 2nd class on one portion thereof—tickets 1 to 7—and extras covering the additional first class charges on another portion—tickets 1' to 3'. If a second class passage is desired, class lever 10 is fixed at its furthest position to the right, distance lever is adjusted to the number of sections to be covered, indicator 50 is turned to indicate the section where the passenger boarded, and a ticket corresponding in length, to the number indicated by the distance lever is inserted in slot 1¹. Indicator 78, viewed through slot 80 will permit the operator to see where the passenger should alight. It requires only a turn of crank 132 to actuate pressure lever 114 and bring surface 120 into contact with the ticket. Even pressure of the ticket against cancellation discs 48 and 51 is assured by springs 123. In the event that the ticket is shorter than the total length of the canceling discs, stops 74 move into position between slide 75 and shoulder 122 and prevent contact of surfaces 120 with the canceling discs. If the passenger wishes to travel in 1st class, the distance lever is set as usual, class lever 10 is displaced to the left, and a strip of the type shown in Fig. 20 is inserted having tickets 1, 2, 3, etc., corresponding to second class (Fig. 19) printed on the right hand portion thereof and tickets 1', 2', etc., covering the extra first class charges printed on the left. This strip is then canceled as above described. The right hand part of the canceled strip indicates the length of the trip as in the case of the second class tickets, while the left hand portion shows that a first class passage was paid for.

The invention is, obviously, not to be considered as limited to the structures illustrated in any particular group of figures. As indicated in the course of the description, the form of device shown in Figs. 11 to 14 may replace the equivalent elements represented in Figs. 1 to 10 or 15 to 18. Similarly, the device illustrated in Figs. 1 to 10 may be modified in accordance with the showing in Figs. 15 to 18.

What we claim is:—

1. In a ticket canceling machine, a casing having an elongated slot formed therein, a pair of movable walls associated with said slot and adapted to vary the effective position and length of the slot opening, means for displacing each of said walls relatively to one another and means operative to prevent certain displacements of said walls relatively to one another.

2. In a machine of the class described, ticket canceling means of fixed length, ticket positioning means, means for varying the length of said ticket positioning means relatively to the length of the ticket canceling means, and means for fixing the length of said positioning means at any one of a plurality of values equal substantially to a predetermined length multiplied by some whole number.

3. In a machine of the class described, ticket canceling means, ticket positioning means adapted to limit the length of a ticket, means for varying the length of said ticket means for varying the length of said ticket canceling and ticket-positioning means relatively to one another, and means operative to force a ticket inserted into the ticket positioning means into contact with the ticket canceling means.

4. In a machine of the class described a movable canceling element adapted to produce indications in each of a plurality of positions of adjustment, means for changing the position of said element, a fixed wall having a slot formed therein, a pair of movable walls associated with said slot and adapted to vary the effective length of the slot opening, means operative to move each of said movable walls relatively to the other, and means controlled by predetermined relative positions of the canceling element and one of said movable walls for preventing displacement of said movable walls relatively to one another.

5. In a machine of the class described a canceling assembly including a rotatable canceling disc, a fixed wall having a slot formed therein, a movable wall associated with said slot and operative to vary the effective length of the slot opening, means for displacing said movable wall, and means operative by the displacement of said movable wall to alter the angular position of said rotatable canceling disc.

6. In a machine of the class described, ticket canceling means of fixed length, ticket positioning means adapted to receive tickets of varying length, size reducing means for reducing the size of the positioning means to lengths less than that of the ticket canceling means, means for forcing tickets introduced into the positioning means into contact with the ticket canceling means, said means being formed in sections, and means connected to said size reducing means for preventing the action of certain of said sections.

7. In a machine of the class described, ticket canceling means including a first rotatable canceling disc, manually operative means for varying the angular position of said disc, and a second rotatable canceling disc,—a fixed wall having a slot formed therein,—a first movable wall associated with said slot and adapted to vary the effective length of the slot opening,—means for displacing said movable wall,—means operative by the displacement of said movable wall to change the angular adjustment of the second rotatable canceling disc,—a second movable wall associated with said slot, means for displacing said second wall relatively to the first movable wall, and means controlled by predetermined relative positions of the first rotatable canceling disc and said first movable wall for preventing movement of said first and second movable walls relatively to one another.

8. In a structure of the class described, adjustable indicating means, a pair of manually operable elements adapted to occupy a plurality of positions, and a differential mechanism interposed between said indicating means and said manually operable elements, said differential mechanism operating to vary the position of adjustment of said indicating means in accordance with variations in the combined positions of said manually operative elements.

In testimony whereof we have hereunto set our hands.

GEORGES KLEIN.
PIERRE MASSOT.